UNITED STATES PATENT OFFICE.

WILLIAM A. DAY, OF BELLINGHAM, WASHINGTON.

COMPOSITION OF MATTER.

1,239,465.     Specification of Letters Patent.     Patented Sept. 11, 1917.

No Drawing.     Application filed March 12, 1917. Serial No. 154,095.

*To all whom it may concern:*

Be it known that I, WILLIAM A. DAY, a citizen of the United States, and a resident of Bellingham, in the county of Whatcom and State of Washington, have invented a certain new and useful Composition of Matter, of which the following is a specification.

My composition consists of the following ingredients, combined in the proportions stated, viz:

| | |
|---|---|
| Lead | 5 pounds. |
| Tin | 5 pounds. |
| Zinc | 1 pound. |

That is, said metals are combined in the proportion of one part of zinc, five parts of tin and five parts of lead. These metals are melted and thoroughly mixed together while in a molten condition and then molded in bars suited for use as solder. I have found this alloy to be very useful in soldering cast iron, mild steel, aluminum, pot-metal and lead. To prepare cast iron or mild steel for joining with this solder the surfaces to be soldered are made clean and bright and then covered with a flux composed of the following ingredients: three parts table salt (sodium chlorid), seven parts water, and seven parts muriatic acid (commercial hydrochloric acid). To prepare aluminum, lead and pot-metal, the surfaces to be soldered are made clean and bright but no flux is applied. If the parts to be joined are massive, their temperature is raised to about 200° F. Then the solder is applied with a hot soldering iron (copper). I have successfully used this solder in joining other metals, but those noted are typical. I have also used other proportions of the metals composing the solder, but I prefer the proportions stated for the method employed. I am also aware that others have used different proportions of the said metals to form solder. I have been granted United States Patent No. 1,195,955, Aug. 22, 1916 for a solder composed of lead, tin and zinc, in proportions different from those above, with which other fluxes are used.

I claim:

The herein-described composition of matter for soldering cast iron, mild steel, pot-metal, aluminum, lead and the like, consisting of lead, five parts; tin, five parts; and zinc, one part, fused together to form an alloy.

Signed at Bellingham in the county of Whatcom and State of Washington this 7th day of March A. D. 1917.

WILLIAM A. DAY.